United States Patent [19]

Schmid et al.

[11] Patent Number: 5,231,730
[45] Date of Patent: Aug. 3, 1993

[54] WIPER BLADE WITH REINFORCING RAIL LOCATING MEANS

[75] Inventors: Eckhardt Schmid, Brackenheim; Wolfgang Scholl, Gemmrigheim, both of Fed. Rep. of Germany

[73] Assignee: SWF Auto-Electric GmbH, Fed. Rep. of Germany

[21] Appl. No.: 549,014

[22] PCT Filed: Jan. 27, 1990

[86] PCT No.: PCT/EP90/00153

§ 371 Date: Oct. 9, 1990

§ 102(e) Date: Oct. 9, 1990

[87] PCT Pub. No.: WO90/08679

PCT Pub. Date: Aug. 9, 1990

[30] Foreign Application Priority Data

Feb. 3, 1989 [DE] Fed. Rep. of Germany ....... 3903219

[51] Int. Cl.[5] .................. B60S 1/40; B60S 1/38
[52] U.S. Cl. ................ 15/250.42; 15/250.36; 15/250.31
[58] Field of Search .......... 15/250.42, 250.36, 250.31, 15/250.35, 250.38

[56] References Cited

U.S. PATENT DOCUMENTS

| | | | |
|---|---|---|---|
| 2,983,945 | 5/1961 | De Pew | 15/250.42 |
| 3,097,734 | 6/1963 | Hoyler | 15/250.42 |
| 3,696,497 | 10/1972 | Quinlan | 15/250.42 |
| 3,902,216 | 9/1975 | Stratton | 15/250.42 |
| 4,389,747 | 6/1983 | Riester | 15/250.42 |
| 4,543,682 | 10/1985 | Kessler et al. | 15/250.42 |

FOREIGN PATENT DOCUMENTS

| | | |
|---|---|---|
| 0007017 | 1/1980 | European Pat. Off. . |
| 0260809 | 3/1988 | European Pat. Off. . |
| 1505439 | 8/1969 | Fed. Rep. of Germany ... 15/250.42 |
| 1505614 | 8/1970 | Fed. Rep. of Germany ... 15/250.42 |
| 2400574 | 7/1974 | Fed. Rep. of Germany ... 15/250.42 |
| 3208749 | 10/1982 | Fed. Rep. of Germany ... 15/250.42 |
| 2215048 | 8/1974 | France . |
| 670922 | 4/1952 | United Kingdom ............ 15/250.42 |
| 930102 | 7/1963 | United Kingdom ............ 15/250.42 |
| 1460202 | 12/1976 | United Kingdom . |

Primary Examiner—Harvey C. Hornsby
Assistant Examiner—Gary K. Graham
Attorney, Agent, or Firm—Robert P. Seitter; J. Gordon Lewis

[57] ABSTRACT

A wiper blade for a windshield wiper system of motor vehicles is described, in which wiper blade a reinforcing rail is secured against longitudinal movement in its central area on the wiper lip. The securement is performed by a cam pressed from the blade and received in a recess of the reinforcing rail. The relative movement between the reinforcing rail and the rubber wiper strip, which cannot be prevented when bent windshields are being wiped, is thereby evenly distributed over the two ends of the wiper strip. This improves the wiping effect of the wiper blade in comparison to known models, where the reinforcing rail is coupled to one end of the wiper strip.

4 Claims, 2 Drawing Sheets

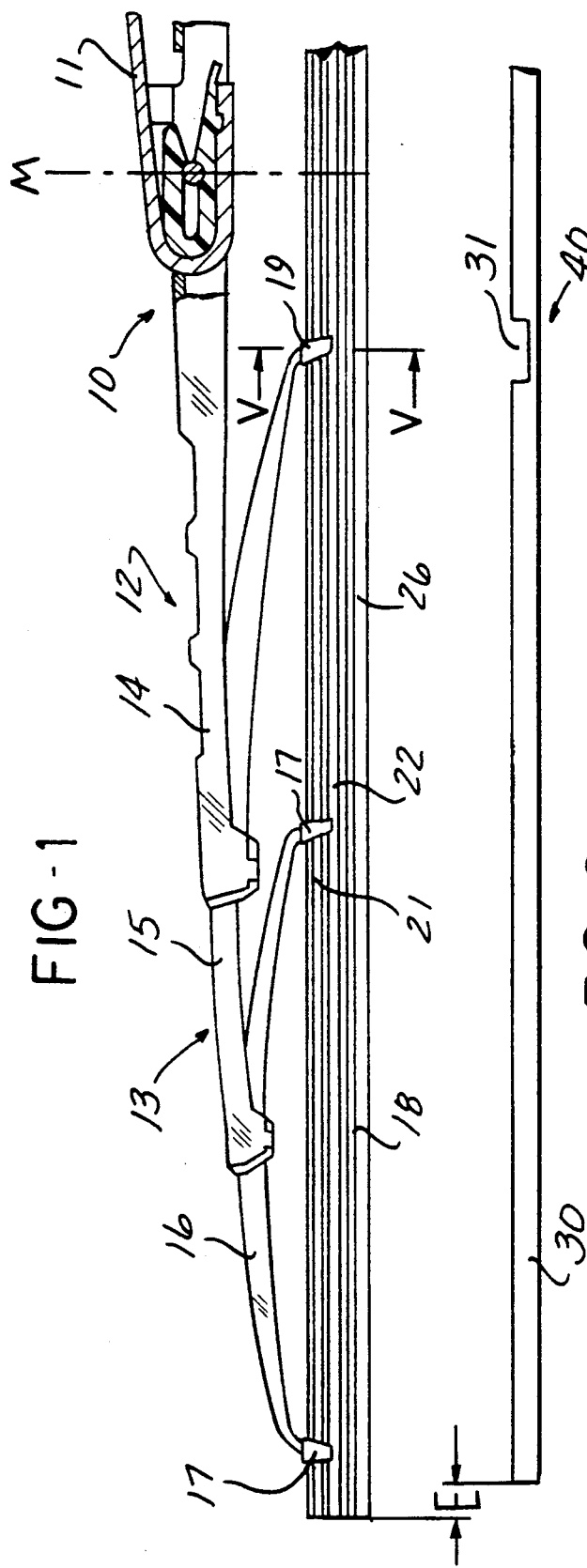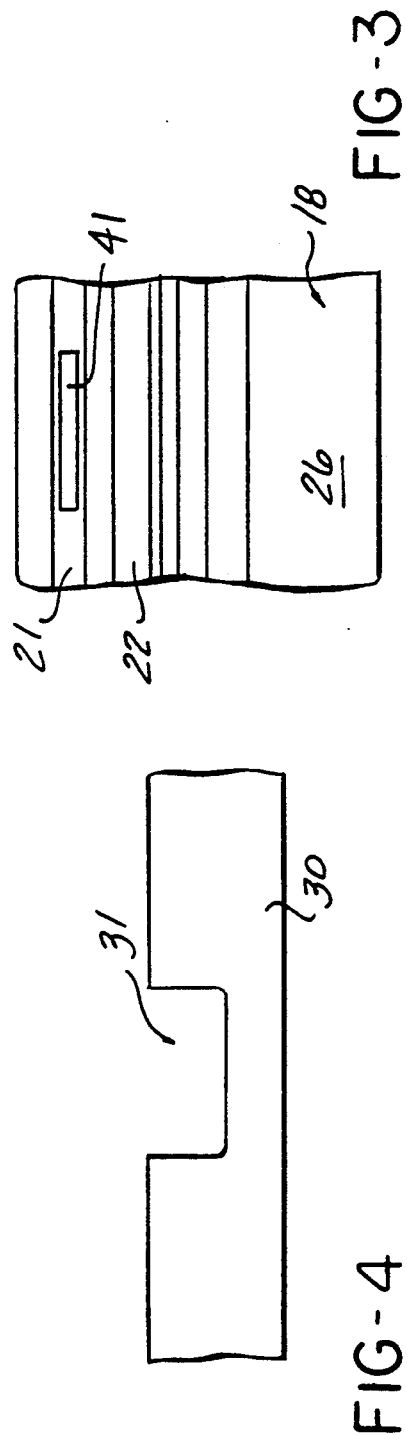

WIPER BLADE WITH REINFORCING RAIL LOCATING MEANS

FIELD OF THE INVENTION

The invention relates to a wiper blade for wiper systems.

BACKGROUND OF THE INVENTION

Normally a wiper blade of a modern motor vehicle consists of a carrier yoke system with a primary yoke and several clawed yokes, of a rubber wiper strip as well as of reinforcing or resilient rails by way of which the pressure exerted only punctually onto the wiper strip via the claws of the carrier yoke system is distributed over the whole wiper strip as evenly as possible. Thereby the wiper strip has a carrier body comprising a first elongated groove each on both sides, in which elongated grooves these reinforcing rails are located in a depressed way. Furthermore the carrier body of the wiper strip has another elongated groove or an elongated channel each on both sides, into which the ends of the claws of the clawed yokes engage. Wiper blades of such a construction are also especially suitable for cleaning bent windshields of motor vehicles because due to the yoke system and to the movable guiding of the claws in the elongated channel the contour of the wiper lip can be adapted to the windshield to be cleaned, for these claws can be moved in the elongated channel and it has also been taken care that a relative movement is possible between the reinforcing rail and the wiper strip.

Wiper blades of this sort are known, in which the elongated groove for the resilient rail is running to the transverse face of the wiper strip only on one side, whereas on the other side this elongated groove is terminated by a cross web. At a distance of this cross web a securing cam is provided in the elongated groove, which securing cam cooperates with a recess in the reinforcing rail and serves as a securing means against a longitudinal movement of this reinforcing rail in relation to the wiper strip. Thus in this embodiment the reinforcing rail is form-fittingly connected with the wiper strip next to its one end. If such a wiper blade is moved over a bent windshield, the reinforcing rails and the wiper strip are bent respectively, whereby there must be a relative movement between the reinforcing rail and the wiper strip. Due to fixing the reinforcing rail stationarily at the one end more and more of these relative movements inevitably occur at the other end. This also occurs, when unavoidably the wiper strip shrinks because of variations in temperature. Due to fixing the reinforcing rail stationarily at the one end a relatively big relative movement is necessary at the other end. This causes problems especially in case of high wiping speed because the wiper strip is not deformed and adapted quickly enough to the windshield to be cleaned so that the wiping effect is decreased.

Correspondingly these explanations also apply to the way the wiper strip is fixed to the carrier yoke system. As to the known wiper blades the carrier yoke system is fixed at the same end of the wiper strip as the resilient rail and the claw at the other end of the carrier yoke system is relatively moved a lot in relation to the wiper strip, if this wiper strip is moved over a bent windshield.

SUMMARY OF THE INVENTION

The object of the present invention is to improve a wiper blade of this kind with respect to its wiping effect without causing higher manufacturing costs.

Thereby the basic idea of the invention is that by displacing the securing means preventing the resilient rail from moving in longitudinal direction in the elongated groove, from the edge to the centre of the wiper strip the necessary compensating movements between the resilient rail and the wiper strip are evenly distributed over both ends.

Considering that in the known embodiment only one end of the reinforcing rail is moved in relation to the wiper strip, whereby, however, it has to travel a relatively long way, in the embodiment according to the invention both ends of the resilient rail can be moved in relation to the wiper strip, whereby only half of the moving way is measured. This is achieved by fixing the resilient rail stationarily in the central area of the wiper strip.

When dimensioning a wiper strip it has to be taken care that also in case of unfavourable tolerances and of great shrinking the reinforcing rail does not extend the transverse face of the wiper strip. Therefore normally the wiper strip is longer than the resilient rail, whereby according to an advantageous development of the invention the unavoidable tolerances are distributed more evenly, if the resilient rail is arranged in the elongated groove in such a way that the end of the rubber wiper strip extending the reinforcing rail is at least approximately of the same length at both ends. Thus as to such an embodiment tolerances can be compensated much better so that the reinforcing rail does not project even then, when the elongated grooves for the reinforcing rail continually extend along the whole wiper strip from the one transverse face up to the other transverse face.

Best qualities are achieved, if these securing means are arranged exactly in the centre of the wiper blade. However, most of the times this is not absolutely necessary, and therefore embodiments are preferred in which these securing means are arranged in the area of such a claw which is closest to the centre. If the reinforcing rail comprises a recess for forming this securing means, in such an arrangement the distribution of the pressure is not disadvantageously influenced by this reinforcing rail, if this recess is just in the area of a claw. Besides, it is of an advantage in such an embodiment that the claw can be used for forming the securing means.

Principally the securing means can be formed in such a way that a force-fitting connection is provided between the wiper strip and the reinforcing rail. Embodiments of this kind are useful, especially with respect to wiper blades which are moved on an orbit over the windshield to be cleaned. If, however, the wiper blade is extended and retracted in radial direction during the circular movement, as this is the case in so-called reciprocating stroke wiper systems, a form-fitting connection between the wiper strip and the reinforcing rail will be provided.

This form-fitting connection can be made in a known way by providing a securing cam on the wiper strip, which securing cam engages into a recess in the reinforcing rail. Thereby this securing cam can already be provided when forming the wiper strip. However, also embodiments are possible, in which this securing cam is only formed by deforming the end of a claw so that the wiper strip, when not being assembled, is of continually the same cross-section along its whole length and therefore can be manufactured in an extrusion process at low costs.

Simultaneously by deforming the claw which is closest to the centre of the wiper strip a force- and/or form-fitting connection can be produced between the carrier yoke system and the wiper strip. Independent protection is claimed for this solution because thus advantages can be achieved even then, when the reinforcing rail next to the end is fixed to the wiper strip. However, an embodiment is especially preferred in which the carrier yoke system and the reinforcing rail are fixed onto the wiper strip in a stable way by deforming the claw.

BRIEF DESCRIPTION OF THE DRAWINGS

The invention and advantageous developments thereof are described by way of the embodiments illustrated in the drawing in which, FIG. 1 is a lateral view of half of a wiper blade, FIG. 2 is the respective partial area of a reinforcing rail, FIG. 3 is a lateral enlarged view of a part of the wiper strip in FIG. 1, FIG. 4 is the enlarged area of the reinforcing rail belonging to FIG. 3.

DETAILED DESCRIPTION OF THE PREFERRED EMBODIMENT

Figure 5:
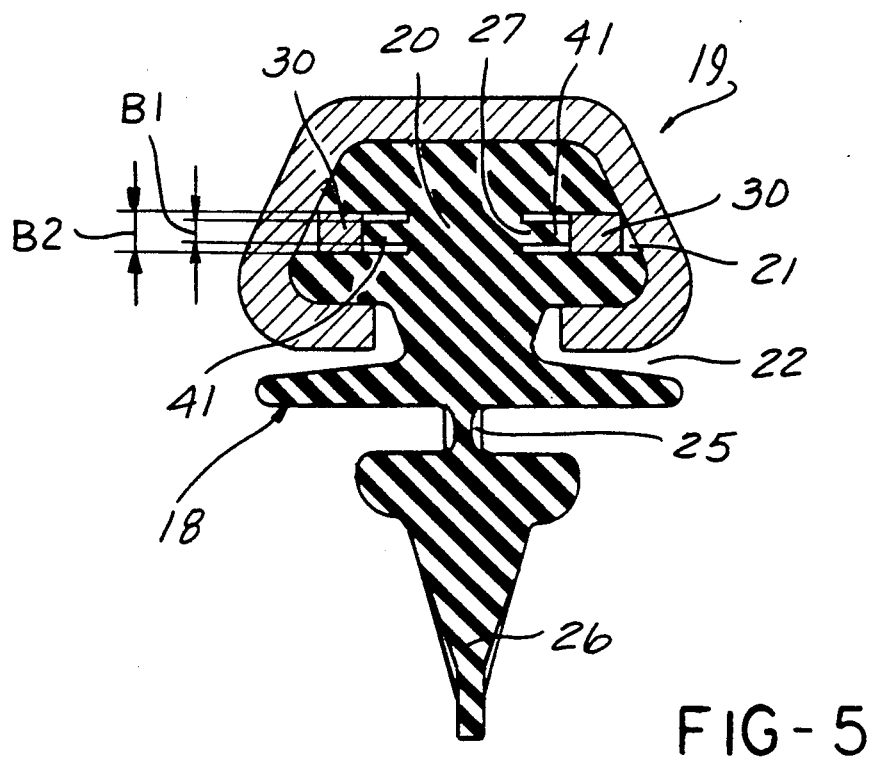
FIG. 5 is an enlarged cross-section of the wiper strip taken along the line V—V and, FIG. 6 is a section similar to FIG. 5 in another embodiment.

A windshield wiper generally designated by 10 for a wiper system of motor vehicles comprises a wiper arm 11 onto which a wiper blade 12 is swivellably mounted, only the left half of which wiper blade 12 is illustrated in FIG. 1. This wiper blade 12 comprises a carrier yoke system 13 consisting—in the illustrated embodiment—of a main yoke 14, a first clawed yoke 15 swivellably mounted to it and often also called intermediate yoke and of a second clawed yoke 16 swivellably mounted to the first clawed yoke 15. The clawed yoke 16 has two claws 17 for guiding a rubber wiper strip generally designated by 18. The other clawed yoke 15 has only one claw designated by 19 in FIG. 1. This claw 19 is closest to the centre of the wiper blade indicated by M.

The rubber wiper strip 18 has the known profile, as it can be seen in FIG. 5. On both sides elongated grooves 21 are worked into a carrier body 20 of a substantially trapezoidal cross-section. Furthermore guide grooves 22 are worked into this carrier body 20 on both sides, the importance of which guide grooves 22 will be explained further on. A wiper lip 26 is connected with this carrier body 20 via a toggle web 25 in a known way. The two elongated grooves 21 serve for receiving a reinforcing rail 30 each serving for evenly distributing the pressure exerted onto the rubber wiper strip 18 via the claws 17, 19 and for guiding said rubber wiper strip 18.

The construction of the wiper blade described so far is principally known. With respect to the present invention it is of importance that there are securing means generally designated by 40, by way of which at one point the reinforcing rail 30 is secured against longitudinal movement in the respective elongated groove 21. In the embodiment according to FIGS. 1 to 5 these securing means 40 comprise a securing cam 41 projecting from the bottom 27 of the elongated groove 21. FIG. 5 makes clear that the width B1 of this securing cam 41 is smaller than the width B2 of the elongated groove 21. However, this is not absolutely necessary and most of the times this securing cam 41 extends along the whole width B2 of the elongated groove 21. Furthermore the securing means 40 comprise an open recess 31 in the resilient rail. The length of this recess 31 corresponds to the length of the securing cam 41 so that a form-fitting connection is produced between the rubber wiper strip 18 and this reinforcing rail 30 by the securing cam's engaging into this recess 31. Thereby it is of special importance that these securing means 40 are arranged in a central area, that is close to the centre M of the wiper blade 12. As to the embodiment illustrated in the FIGS. 1 to 5 the centre is not exactly chosen, but these securing means 40 are located in the area of the claw 19 which is closest to the centre M of the wiper strip 18. Thereby the length of the reinforcing rail 30 is smaller than the length of the wiper strip 18, whereby the reinforcing rail 30 is arranged in relation to the wiper strip in such a way that at both ends the end portion E of the wiper strip 18 extending the reinforcing rail 30 is at least approximately of the same length.

The advantage of arranging the securing means 40 in the area of the claw 19 is that the material of the reinforcing rail 30 weakened by the recess 31 does not influence the distribution of the pressure negatively.

Figure 6:
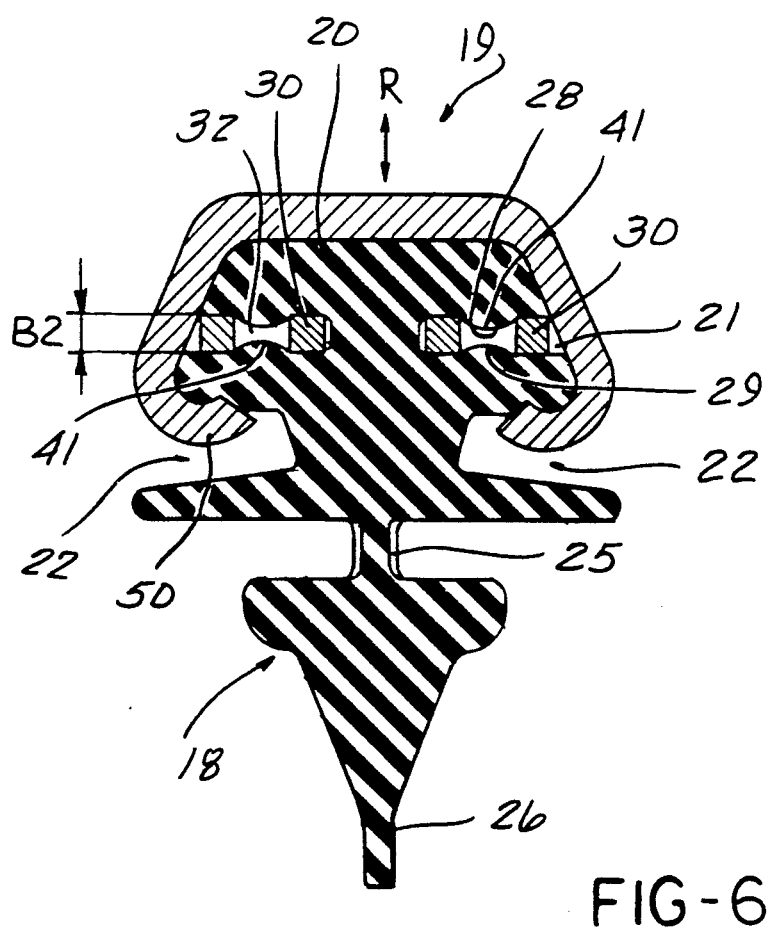

The embodiment according to FIG. 6 substantially differs from that according to FIG. 5 in the fact that the reinforcing rail 30 comprises an aperture 32 that is closed all around and that the securing cams 41 engaging into said aperture 32 are formed out of the side walls 28, 29 of the elongated groove 21 of the carrier body of the wiper strip 18 by pushing material aside. This deformation of material for forming the securing cams 41 is made by deforming the end portion 50 of the claw 19 gripping the carrier body 20, which end portion 50 engages into the guide groove 22. This end portion 50 of the claw 19 is partially bent in the shape of a hook in such a way that its end points into the direction of the reinforcing rail 30. Thus the resilient material of the carrier body 20 is pressed, whereby a certain portion engages into the aperture or recess 32 in the reinforcing rail 30. By way of deforming the carrier body 20 of the wiper strip into the direction R perpendicularly to the windshield to be cleaned, on the other side, too, material is pressed into the recess 32 as a securing cam, as it is made clear in FIG. 6. Thus in this embodiment, too, a form-fitting connection is provided between the reinforcing rail 30 and the wiper strip 18. Since in the embodiment according to FIG. 6 a closed aperture 32 is used as a securing means, the reinforcing rail 30 is additionally secured against a movement crosswise to the longitudinal direction of the wiper strip 18. So the reinforcing rail 30 and the claw 17 can be prevented from touching each other metallically.

In the embodiment according to FIG. 6 it can be seen that the reinforcing rail can also be connected with the wiper strip only force-fittingly. For, if the reinforcing rail 30 does not comprise a recess or apertures 32, the width B2 of the elongated groove 21 is partially reduced by way of bending the end portion 50 of the claw to such an extent that this reinforcing rail 30 is held by press-fit, that is force-fittingly, in this portion between the side walls 28, 29.

The embodiment according to FIG. 6 shows that a claw, namely the claw 19 closest to the centre of the wiper blade, is used for forming the securing means. Of course, this is not absolutely necessary, for a separate clamp could be used, which clamp—similar to this claw 19—provides a form-fitting or force-fitting connection between the reinforcing rail and the wiper strip exactly in the centre M of the wiper strip.

Furthermore FIG. 6 makes clear that the end portion 50 of the claw 19 pierces into the rubber elastic material of the wiper strip 18 so that thus at least a force-fitting connection, in case of the end portion being suitably formed, also a form-fitting connection within the carrier yoke system, that is between the intermediate yoke 15 and the wiper strip 18, is provided. Thus in contrast to the known embodiments the carrier yoke system is also locked with the rubber wiper strip 18 in the central area and not in an end portion. Thus danger of the ultimate claw's 17 gliding out of the guide groove 22 is reduced, if the wiper strip shrinks extraordinarily. Independent protection is claimed for this idea because such a solution already contains a functional improvement, even if the reinforcing rail is not fixed in the central area of the wiper strip. However, the combination illustrated in FIG. 6 is especially preferred because the cross-section of the wiper strip is continually the same along the whole length. Thereby the carrier yoke system and the wiper strip can be pinched or crimped together and the reinforcing rail can simultaneously be secured against a longitudinal movement in one operational step, whereby it is of a special advantage that due to continually the same cross-section the wiper strip can be manufactured in an extrusion process at low costs. The assembly of the carrier yoke system, too, is easier than in many known embodiments because slipping of the clawed yokes is not hindered by projecting securing cams. Due to continually the same cross-section of the rubber wiper strip in the embodiment according to FIG. 6 different lengths of wiper blades can be manufactured at low costs without any additional tools.

What is claimed is:

1. A wiper blade, for windshield wiper systems of motor vehicles with a carrier yoke system for guiding a wiper strip including a wiper lip mounted onto a carrier body via a web, the wiper blade comprising:
    the carrier yoke system including at least one claw located near to a central area along a longitudinal length of the carrier yoke system;
    the carrier body having two longitudinally extending sides opposite from one another and an elongated groove formed on each side of the carrier body;
    an elongated reinforcing rail received in each elongated groove, wherein a longitudinal length of each reinforcing rail is smaller than a longitudinal length of the wiper strip, the elongated reinforcing rail including a recess in the central area;
    securing means at one point for securing each elongated reinforcing rail against longitudinal movement in the respective elongated groove, the securing means exclusively arranged in the central area, wherein the securing means defines a form-fitting connection provided between the wiper strip and the reinforcing rail, and the securing means includes a securing cam formed onto the wiper strip engaging into the recess formed in the reinforcing rail, wherein the securing cam is pressed out of a sidewall of the elongated groove by deforming an end portion of the at least one claw.

2. A wiper blade according to claim 1, wherein the carrier body of the wiper strip is deformed in one direction perpendicularly to the windshield to be cleaned by deforming the end portion of the claw and the claw defines securing cams pressed into the recess of the reinforcing rail from opposite sides of the sidewalls of the elongated groove.

3. A wiper blade according to claim 1, wherein the recess of the reinforcing rail further comprises an aperture into which the securing cam engages.

4. A windshield wiper blade comprising:
    a longitudinally elongated wiper strip defining at least one elongated groove therein with at least one sidewall;
    an elongated reinforcing rail including a recess in a central area, the elongated rail disposed within said at least one elongated groove;
    a carrier yoke system for carrying said strip and rail in assembly, said carrier yoke system having at least one claw located near to a central area along the longitudinally elongated wiper strip; and
    means operative to secure said rail to said yoke system at the central area to prevent relative longitudinal movement therebetween, said means including the claw having a deformed end portion for pressing a securing cam out of the sidewall of the elongated groove adjacent the claw, and said securing cam engaging into the recess of the reinforcing rail.

* * * * *